(No Model.)

E. MUSSO.
SKEWER OR NEEDLE FOR CLOSING FOWLS, &c.

No. 482,969. Patented Sept. 20, 1892.

WITNESSES:
P. H. Cagle
L. Douville

INVENTOR
Emma Musso
BY
John A. Wiederstein
ATTORNEY.

UNITED STATES PATENT OFFICE.

EMMA MUSSO, OF VINELAND, NEW JERSEY.

SKEWER OR NEEDLE FOR CLOSING FOWLS, &c.

SPECIFICATION forming part of Letters Patent No. 482,969, dated September 20, 1892.

Application filed April 28, 1892. Serial No. 430,966. (No model.)

*To all whom it may concern:*

Be it known that I, EMMA MUSSO, a citizen of the United States, residing at Vineland, county of Cumberland, and State of New Jersey, have invented a new and useful Improvement in Skewers or Needles for Closing Fowls, &c., which improvement is fully set forth in the following specification and accompanying drawings.

My invention consists of an improvement in skewers or needles for closing fowls, &c., whereby the openings in the latter may be closed in a convenient and effective manner.

Figure 1:
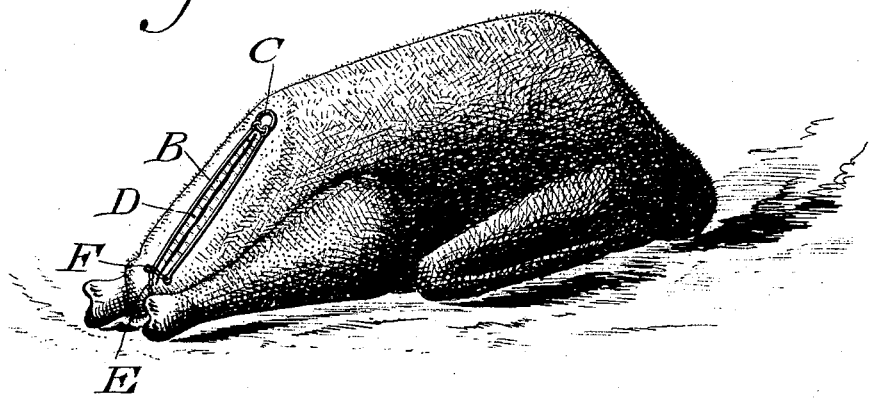
Figure 2:
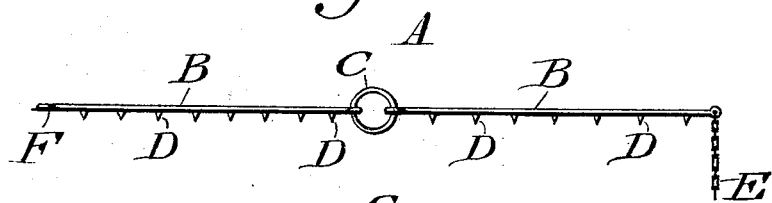
Figure 3:
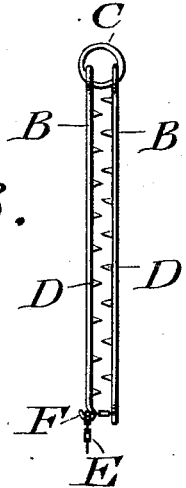

Figure 1 represents a perspective view of a skewer embodying my invention, the same being shown in position on a fowl. Figs. 2 and 3 represent the skewer respectively in open and closed conditions.

Similar letters of reference indicate corresponding parts in the several figures.

Referring to the drawings, A designates a skewer formed of the arms B B, which are connected by the ring C as a hinge and having on the opposite faces teeth or pins D D, the same facing each other when the arms are closed. Secured to the end of one arm is the chain E and on the end of the other is the hook F, whereby, when desired, the arms may be locked.

The operation of the device is as follows: When a fowl is filled, the arms of the skewer are placed on either side of the opening, so that the teeth may penetrate the flesh. The arms are fully brought together, thus drawing the walls of the opening to each other, after which said arms are secured by the chain and hook, whereby the opening is held closed. Owing to the ring C, as the arms are freely hung on said ring said arms may adjust themselves in lateral direction to adapt the device to the flesh of varying thicknesses and irregularities. The skewer may be quickly applied and removed, easily cleansed, and is of inexpensive construction.

Having thus described my invention, what I claim as new, and desire to secure by Letters Patent, is—

1. A skewer consisting of adjustably-hinged arms adapted to engage the walls of the openings in fowls, poultry, &c., and close said openings, substantially as described.

2. A skewer having arms with teeth thereon, said arms having means for adjustably connecting them at one end and means for adjustably securing the same on the other end, substantially as described.

3. Skewers adjustably hung at one end on a ring and provided at the opposite ends with a fastening device, substantially as described.

EMMA MUSSO.

Witnesses:
JOHN A. WIEDERSHEIM,
WM. C. WIEDERSHEIM.